United States Patent
Malkamaki et al.

(10) Patent No.: US 8,958,404 B2
(45) Date of Patent: *Feb. 17, 2015

(54) APPARATUS AND METHOD FOR PROVIDING ACCESS TO A LOCAL AREA NETWORK

(75) Inventors: Esa Malkamaki, Espoo (FI); Klaus Doppler, Albany, CA (US); Jussi Ojala, Helsinki (FI); Tero Henttonen, Espoo (FI); Juha S. Korhonen, Espoo (FI)

(73) Assignee: Nokia Corporation, Espoo (FI)

( * ) Notice: Subject to any disclaimer, the term of this patent is extended or adjusted under 35 U.S.C. 154(b) by 104 days.

This patent is subject to a terminal disclaimer.

(21) Appl. No.: 13/498,196

(22) PCT Filed: Sep. 30, 2009

(86) PCT No.: PCT/IB2009/054285
§ 371 (c)(1),
(2), (4) Date: Mar. 26, 2012

(87) PCT Pub. No.: WO2011/039571
PCT Pub. Date: Apr. 7, 2011

(65) Prior Publication Data
US 2012/0184282 A1    Jul. 19, 2012

(51) Int. Cl.
*H04W 4/00*    (2009.01)
*H04W 36/00*    (2009.01)
(Continued)

(52) U.S. Cl.
CPC .............. *H04W 48/14* (2013.01); *H04W 88/06* (2013.01)
USPC ..... 370/338; 370/331; 455/432.1; 455/435.1; 455/436; 455/452.1; 455/466

(58) Field of Classification Search
USPC ........... 455/452.1, 450, 509, 464, 436, 435.1, 455/444, 448, 466, 410–411; 370/331, 338, 370/252, 351, 395.2–395.43, 470, 471–472, 370/516
See application file for complete search history.

(56) References Cited

U.S. PATENT DOCUMENTS

2006/0178131 A1* 8/2006 Huotari et al. ................. 455/410
2008/0101400 A1* 5/2008 Auterinen ..................... 370/463
(Continued)

FOREIGN PATENT DOCUMENTS

| CN | 101069441 A | 11/2007 |
|---|---|---|
| CN | 101411115 A | 4/2009 |
| EP | 1313270 A2 | 5/2003 |

OTHER PUBLICATIONS

3GPP TS 24.301 v8.2.1 (Jun. 2009) 3rd Generation Partnership Project; Technical Specification Group Core Network adn Terminals; Non-Access-Stratum (NAS) protocol for Evolved Packet System (EPS) Stage 3 (Release 8).*
(Continued)

*Primary Examiner* — Michael Mapa
(74) *Attorney, Agent, or Firm* — Harrington & Smith

(57) ABSTRACT

An apparatus, system and method for providing access to a local area network for user equipment operable in a wide area network such as a long term evolution cellular network. In one embodiment, the apparatus (1020) for use with a user equipment includes a resource allocator (1031) configured to generate a message for the long term evolution cellular network requesting at least one characteristic of a local area network. The apparatus (1020) also includes an accumulator (1032) configured to receive the at least one characteristic of the local area network to enable the user equipment to access the local area network.

22 Claims, 13 Drawing Sheets

(51) Int. Cl.
  *H04W 72/00* (2009.01)
  *H04W 48/14* (2009.01)
  *H04W 88/06* (2009.01)

(56) References Cited

U.S. PATENT DOCUMENTS

2010/0120455 A1* 5/2010 Aghili et al. .................. 455/466
2010/0216471 A1* 8/2010 Meyer et al. .................. 455/436

OTHER PUBLICATIONS

3GPP TS 36.300, V8.5.0 (May 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (134 pages).

3GPP TS 23.401, V8.6.0 (Jun. 2009), 3rd Generation Partnership Project; Technical Specification Group Services and System Aspects; General Packet Radio Service (GPRS) enhancements for Evolved Universal Terrestrial Radio Access Network (E-UTRAN) access (Release 8) (227 pages).

3GPP TS 24.301, V8.2.1 (Jun. 2009), 3rd Generation Partnership Project; Technical Specification Group Core Network and Terminals; Non-Access-Stratum (NAS) protocol for Evolved Packet System (EPS); Stage 3 (Release 8) (221 pages).

3GPP TS 24.011, V8.2.0 (Jun. 2009), Digital cellular telecommunications system (Phase 2+); Universal Mobile Telecommunications System (UMTS): LTE; Point-to-Point (PP) Short Message Service (SMS) support on mobile radio interface (3 GPP TS 24.011 version 8.2.0 Release 8) (111 pages).

* cited by examiner

APPARATUS AND METHOD FOR PROVIDING ACCESS TO A LOCAL AREA NETWORK

RELATED APPLICATION

This application was originally filed as PCT Application No. PCT/IB009/054285 on Sep. 30, 2009 which is incorporated herein by reference in its entirety.

TECHNICAL FIELD

The present invention is directed, in general, to communication systems and, in particular, to an apparatus, system and method for providing access to a local area network for user equipment operable in a wide area network.

BACKGROUND

Long Term Evolution ("LTE") of the Third Generation Partnership Project ("3GPP"), also referred to as 3GPP LTE, refers to research and development involving the 3GPP Release 8 and beyond, which is the name generally used to describe an ongoing effort across the industry aimed at identifying technologies and capabilities that can improve systems such as the universal mobile telecommunication system ("UMTS"). The goals of this broadly based project include improving communication efficiency, lowering costs, improving services, making use of new spectrum opportunities, and achieving better integration with other open standards. The 3GPP LTE project is not itself a standard-generating effort, but will result in new recommendations for standards for the UMTS. Further developments in these areas are also referred to as Long Term Evolution-Advanced ("LTE-A").

The evolved UMTS terrestrial radio access network ("E-UTRAN") in 3GPP includes base stations providing user plane (including packet data convergence protocol/radio link control/medium access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment ("UE") or a mobile station ("MS"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300, v8.5.0 (2008-05), which is incorporated herein by reference. The terms base station, NB, eNB, and cell refer generally to equipment providing the wireless-network interface in a cellular telephone system, and will be used interchangeably herein, and include cellular telephone systems other than those designed under 3GPP standards.

Due to uncontrolled circumstances in the operation of a local area network, such as local interference that may be due to unintentional jamming by another radio system operating in the same area or a change in a particular band of frequencies employed by an access point ("AP") in the local area network, a user equipment may not have access to the local area network. During a period of time of non-network use, such as a period of time out of normal working hours or a period of time during which a member of a family is away from home, an efficient power-save operation may be employed at the access point and at the user equipment. The user equipment that enters the serving area of a local area network may not be able to access, initiate communication with or connect to the local area network due to a lack of an access authorization such as an access key. Thus, the user equipment may not be able to access the local area network (in the case of jamming or due to lack of an access key), or the user equipment may have to do a time- and energy-consuming search for the local area network when the local area network changes an operational parameter such as a frequency band or a channel within the band.

In view of the growing deployment and sensitivity of users to communication performance in local and wide area networks, further improvements are necessary for handling a user equipment's access to a local area network. Therefore, what is needed in the art is an apparatus, system and method for providing access to a local area network for user equipment operable in a wide area network that overcomes the deficiencies of conventional communication systems.

SUMMARY OF THE INVENTION

These and other problems are generally solved or circumvented, and technical advantages are generally achieved, by embodiments of the present invention, which include an apparatus, system and method for providing access to a local area network for user equipment operable in a wide area network such as a long term evolution cellular network. In one embodiment, the apparatus (e.g., a processor) for use with a user equipment includes a resource allocator configured to generate a message for the long term evolution cellular network requesting at least one characteristic of a local area network. The apparatus also includes an accumulator configured to receive the at least one characteristic of the local area network to enable the user equipment to access the local area network.

In another aspect, the present invention provides an apparatus (e.g., a processor) for use with a local area support node associated with a long term evolution cellular network. In one embodiment, the apparatus includes an accumulator configured to receive a message from a user equipment requesting at least one characteristic of a local area network. The apparatus also includes a resource allocator configured to provide the at least one characteristic to enable the user equipment to access the local area network.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, system and method for providing access to a local area network for user equipment operable in a wide area network. Although systems and methods described herein are described with reference to a 3GPP LTE cellular network, they can be applied to any communication system including a Global System for Mobile Communications ("GSM") system.

Figure 1:
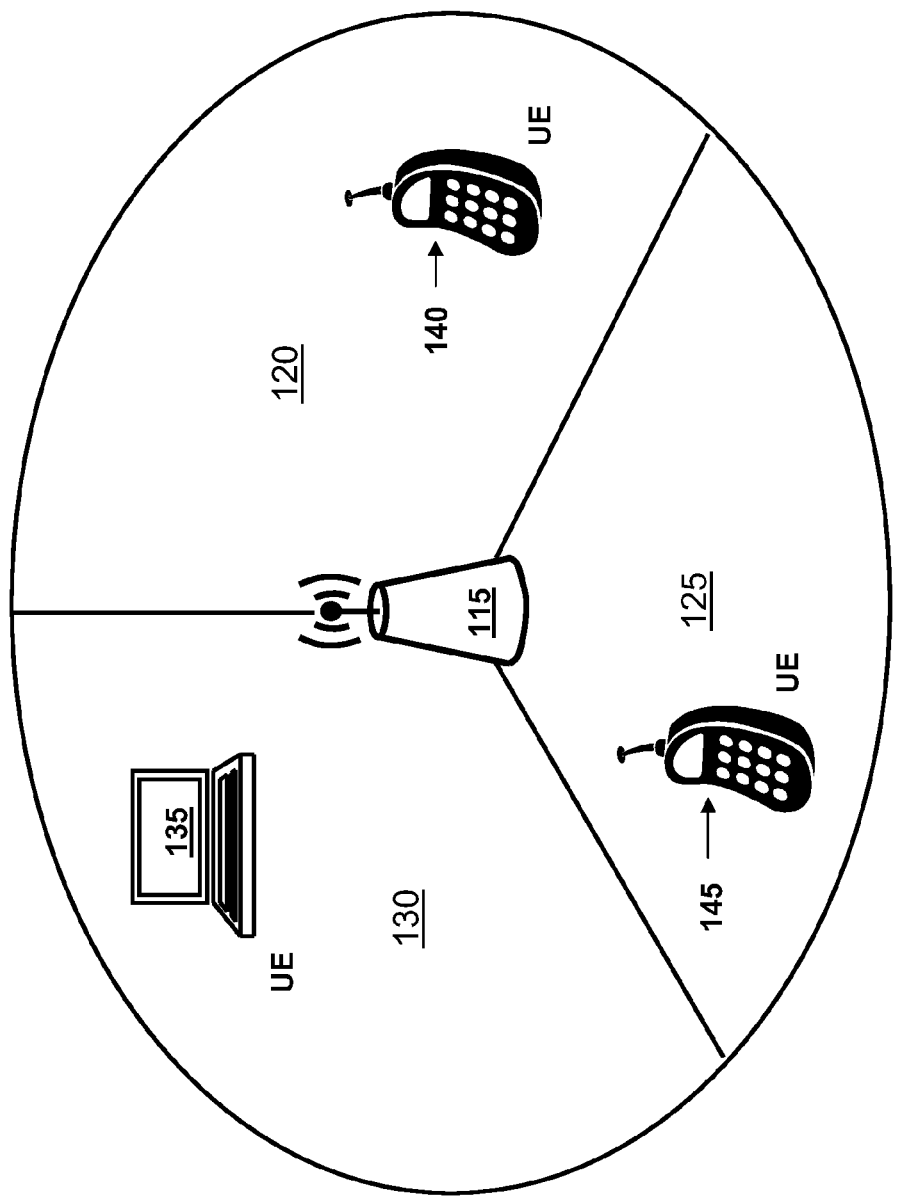
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g., the first sector 120), a sector (e.g., the first sector 120) may generally contain a plurality of wireless communication devices. In an alternative embodiment, a base station 115 may be formed with only one sector (e.g., the first sector 120), and multiple base stations may be constructed to transmit according to collaborative/cooperative multiple-input multiple-output ("C-MIMO") operation, etc. The sectors (e.g., the first sector 120) are formed by focusing and phasing radiated signals from the base station antennas, and separate antennas may be employed per sector (e.g., the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas.

Figure 2:
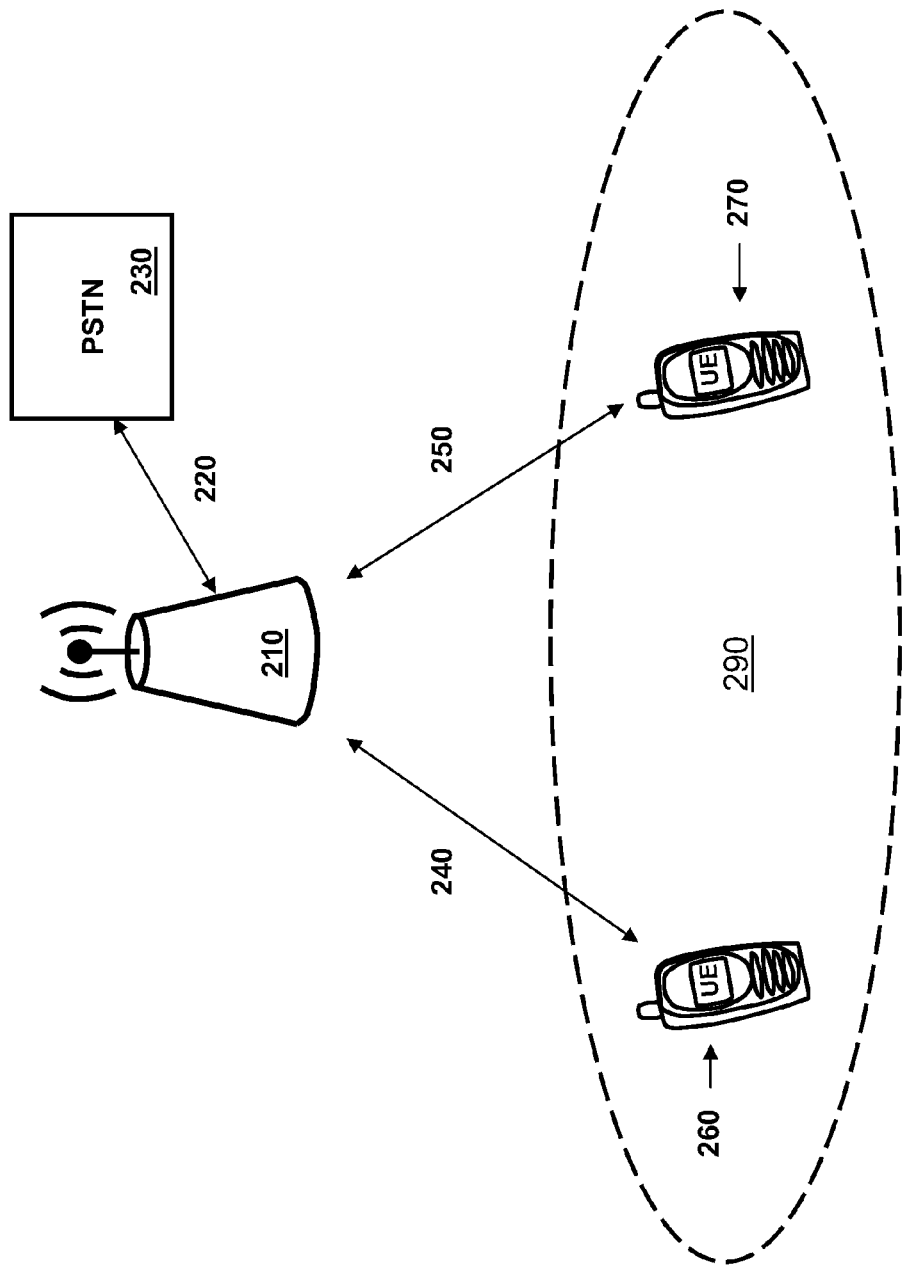

Turning now to FIG. 2, illustrated is a system level diagram of an embodiment of a communication system including a base station and wireless communication devices that provides an environment for application of the principles of the present invention. The communication system includes a base station 210 coupled by communication path or link 220 (e.g., by a fiber-optic communication path) to a core telecommunications network such as public switched telephone network ("PSTN") 230. The base station 210 is coupled by wireless communication paths or links 240, 250 to wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes.

Figure 3:
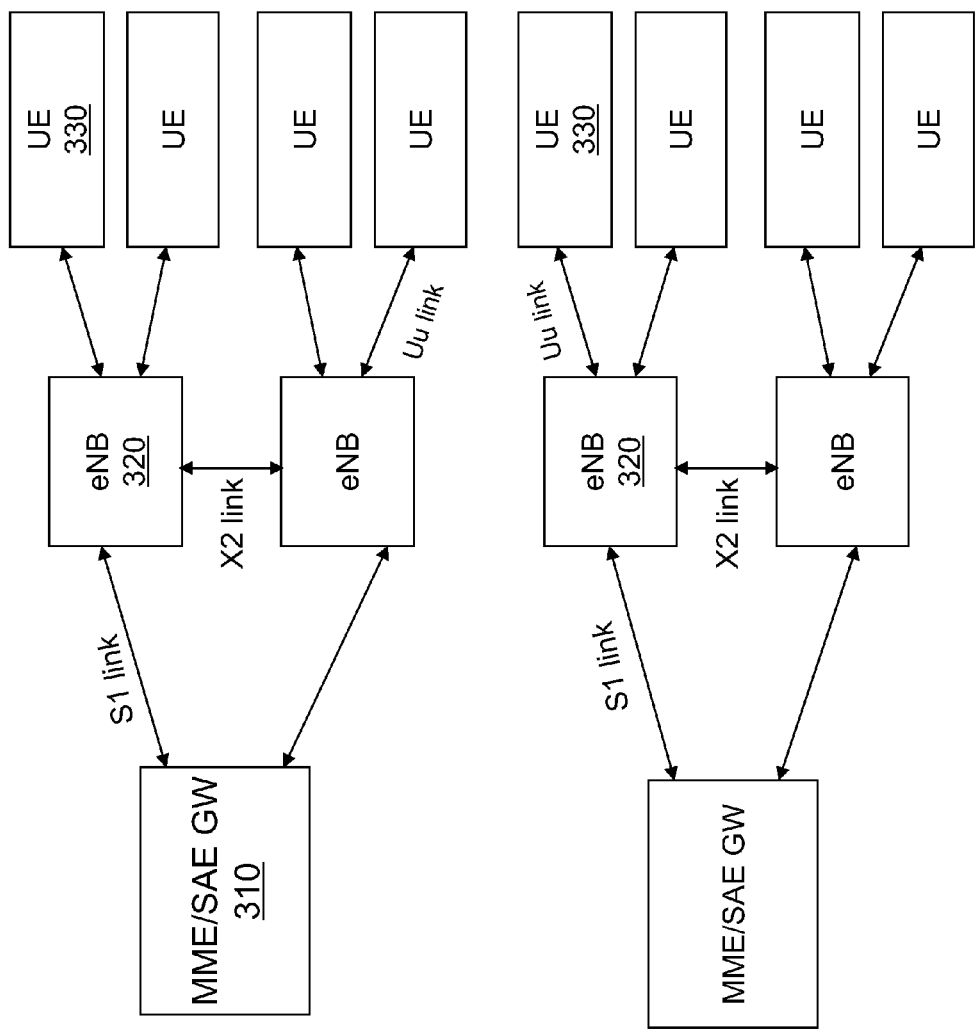
FIGS. 3 to 5 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (designated "X2 link"). The various communication links are typically fiber, microwave, or other high-frequency metallic communication paths such as coaxial links, or combinations thereof.

The base stations 320 communicate with user equipment ("UE," ones of which are designated 330), which is typically a mobile transceiver carried by a user. Thus, communication links (designated "Uu" communication links, ones of which are designated "Uu link") coupling the base stations 320 to the user equipment 330 are air links employing a wireless communication signal such as, for example, an orthogonal frequency division multiplex ("OFDM") signal.

Figure 4:
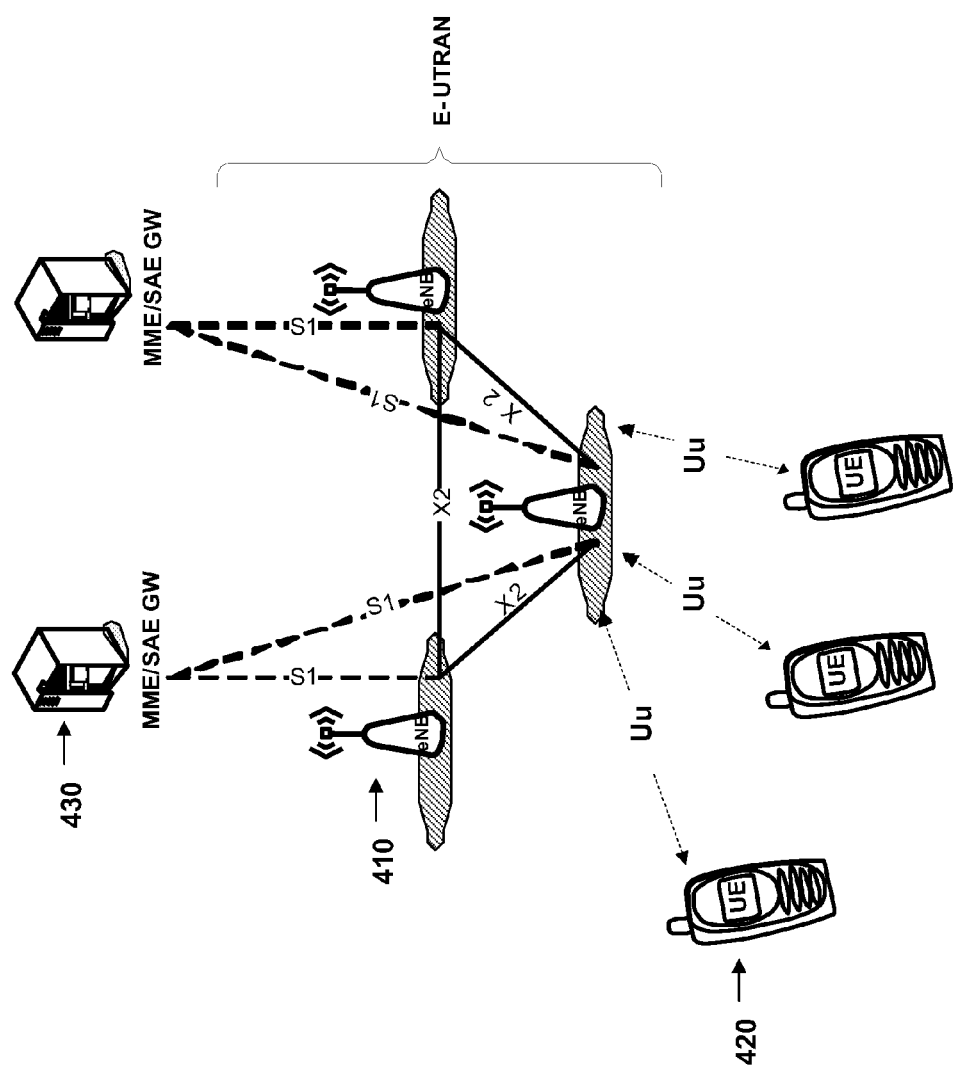

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (payload data, packet data convergence protocol/radio link control/media access control/physical sublayers) and control plane (radio resource control sublayer) protocol terminations towards user equipment (one of which is designated 420). The base stations 410 are interconnected with X2 interfaces or communication links (designated "X2"). The base stations 410 are also connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user signal streams, ciphering of user signal streams, radio bearer control, radio admission control, connection mobility control, dynamic allocation of resources to user equipment in both the uplink and the downlink, selection of a mobility management entity at the user equipment attachment, routing of user plane (also referred to as "U-plane") data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 receives an allocation of a group of information blocks from the base stations 410.

It is recognized that local area networks such as WiFi networks can provide an alternative means of telecommunication access for user equipment compared to Global System for Mobile Communications ("GSM"), the Universal Mobile Telecommunications System ("UMTS"), High Speed Packet Access ("HSPA") and LTE cellular networks. Unlike a wide area network, a local area network such as WiFi can utilize portions of the license-exempt spectrum to take advantage of additional bandwidth to provide high-speed telecommunications access. Since user equipment will likely be able to operate with a transceiver that can access the local area network and the wide area network, the wide area network can be utilized to enhance the user equipment experience in the local area network. Applications (e.g., middleware) running on the user equipment can decide whether to use an available local area network, the wide area network, or both at the same time for services such as Internet services. The local area network can be structured so that selected services such as voice or emergency calls will still be available to the user equipment through the wide area network. Hence, the user equipment will not completely hand over its telecommunications operations to the local area network, but dual radio operation is preferable when accessing the local area network. Thus, a level of cooperation between the wide area network and the local area network during local area network access is preferable.

As used herein, a wide area network (or system or communication system) refers to a network that provides wireless communication services employing a plurality of base stations with access to a common backbone such as a PSTN. A wide area network provides communication services over a broad physical area including communication paths or links that cross metropolitan, regional or national boundaries. The operation of the plurality of base stations is coordinated across the wide area network so that the user equipment can move seamlessly with handovers across the broad physical area served by the wide area network. Examples of wide area networks include networks operated by commercial telecommunication operators such as Verizon and AT&T for the benefit of customers, with telecommunications services provided under established tariffs. The wide area networks may be structured with systems designed according to 3GPP specifications, including various levels of LTE capability, or with other standards such as compatible with GSM or Worldwide Interoperability for Microwave Access ("WiMAX") communication systems.

A local area network (or system or communication system) refers to a network that provides isolated nodes of communication service by an enterprise such as a home, office, hotel, campus, airport, and for enterprise members such as family members, students or employees. The services provided at one node of a local area network are generally not coordinated with services provided by another node. A local area network is typically managed by the enterprise or a surrogate thereof. For example, a person may turn off a router that provides services in his home, or change the channels over which the local area network operates. The operation of a router in one home will generally be uncoordinated with the operation of a router in a neighbor's home, and access to one will not be coordinated with access to the other. A local area network may be coupled to a PSTN through a port such as a fiber port, a coaxial line, one or more tip-and-ring pairs, or a microwave link that communicates with the PSTN through a wide area network. An example of a local area network is a wireless network in a home or business environment operating under the IEEE standards 802.11, which is incorporated herein by reference, that describe WiFi communication services.

The 3GPP is a likely forum for standardization of a wide area network such as the LTE cellular network operation with a wireless local area ("LA") network or system. An LTE cellular network would be positioned as a 3GPP system, challenging current wireless local area network ("WLAN") systems structured with earlier designs. To achieve standardization in 3GPP, acceptance from system operators is needed. An area of interest for wireless operators is that they can offload bulk Internet traffic from the wide area network to a local area network, while offering a seamless user experience for their services in the local area network. To enable such offloading of services, it is reasonable to assume that local area network operation is supported by the wide area network with cooperation therebetween.

Two possible states of operation can be assumed for operation of a local area network. One state of operation is an integrated system (or operational mode) with a local area network and a wide area network, and another state of operation is a local area network with stand-alone operational mode. The integrated operational mode with the wide area network such as GSM, UMTS, HSPA and LTE, may be the default mode.

Figure 5:
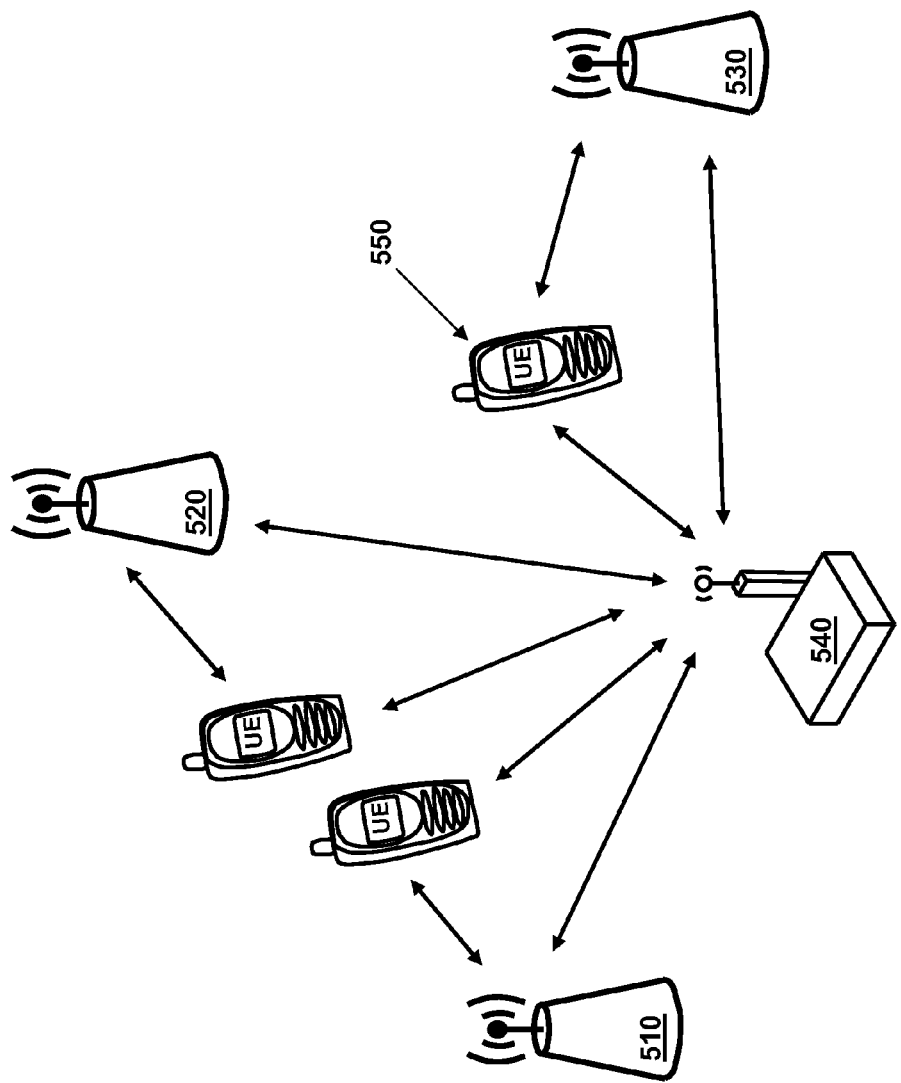

Turning now to FIG. 5, illustrated is a system level diagram of an embodiment of a communication system including a wireless communication system that provide an environment for application of the principles of the present invention. The communication system includes a wide area network (or wireless communication system such as an LTE cellular network) formed with a plurality of base stations 510, 520, 530 that provide support for the operation thereof and the operation of the local area network. The user equipment (one of which is designated 550) can communicate with both the wide area network and the local area network. The local area network is formed with a wireless router 540 that provides local wireless communications services, and may provide access to a local computer and perhaps other devices such as a wireless printer. The local area network provides the user equipment 550 with user plane ("U-plane") data and at least a portion of control plane ("C-plane") messages that are supported through the wide area network. As introduced herein, the local area access point such as the router 540 illustrated in FIG. 5 may communicate with a local area support node (or support node) that may be located in a server of the wide area network or in an Internet-related facility as described later hereinbelow.

Control plane messages refer to messages that control traffic transmitted between elements of a network and thus relate to management of the network such as allocation of communication resources to a particular user equipment, admittance of the user equipment to the network, polling messages, handover messages, channel quality information messages, etc. The user plane messages refer to messages containing the actual payload data communicated to or from the user equipment. A network operator thus has visibility of, and makes functional use of, the control plane messages, while the user plane messages are generally not read by the operator and generally contain information of importance only to the user of the user equipment. As introduced herein, a portion of control signaling (i.e., control plane messages) may be sent to and received by the user equipment through the wide area network as user plane messages.

Figure 6:
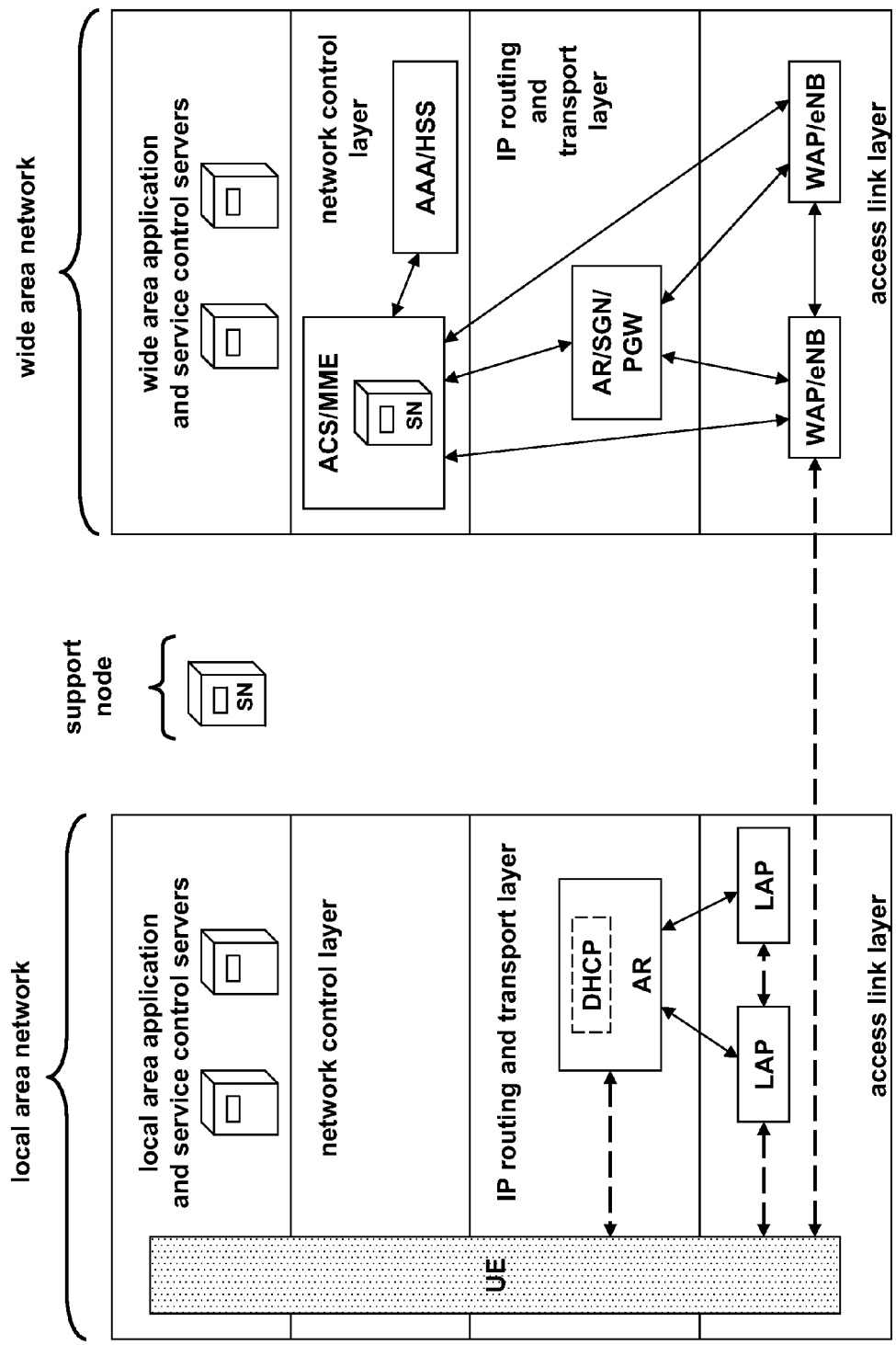
FIG. 6 illustrates a system level diagram of an embodiment of a local area network, a wide area network and a local area support node of a communication system in accordance with the principles of the present invention.

Turning now to FIG. 6, illustrated is a system level diagram of an embodiment of a local area network, a wide area network and a local area support node of a communication system in accordance with the principles of the present invention. The local area network and the wide area network (e.g., a LTE cellular network) and the user equipment have wireless communication capability, and the control plane messages that may be transmitted over these wireless links are represented in FIG. 6 by dashed lines. Four functional layers of the local area network and the wide area network are illustrated in FIG. 6 including local area and wide area application and service control servers, a network control layer, an IP routing and transport layer, and an access link layer. In the wide area network, the network control layer includes an access control server ("ACS")/mobility management entity ("MME") that communicates with an authentication, authorization, accounting/home subscriber server ("AAA/HSS"). The ACS/MME communicates with an access router/service gateway node/packet gateway ("AR/SGN/PGW") in the IP routing and transport layer that in turn communicates with a wide area access point ("WAP"), for example, a base station, in the access link layer.

The user equipment is shown in the local area network. In the local area network, the access link layer includes a local area access point ("LAP") that communicates with an access router ("AR") that provides dynamic host configuration protocol ("DHCP") services for the local area network. The local area network illustrated in FIG. 6 is supported by local area support node(s) (or support node(s) designated "SN"). The local area support node can be located within a single operator's network, such as in a mobile management entity, and/or within the Internet to support multiple operators, as represented by the local area support node outside of the local and wide area networks. It may be operated, for example, by a consortium of local area network device/access point manufacturers, including a part of the Nokia Ovi ("door" in Finn-ish) service offering that provides access to games, maps, media, messaging, and music.

The local area support node processes control plane messages and is able to send control plane messages to the access points and to the user equipment via a local area access point such as a local router, or via a wide area access point such as a base station. In cases where the local area support node is within the operator's network, control plane messages may be sent directly to the local area support node, and local area support node functionalities may be integrated inside existing network nodes. In the case where the local area support node is outside the operator's network, the control plane messages are forwarded or tunneled from an existing network node to the local area support node through the Internet. Thus, the local area support node can reach the local area access point through an IP connection.

Figure 7:
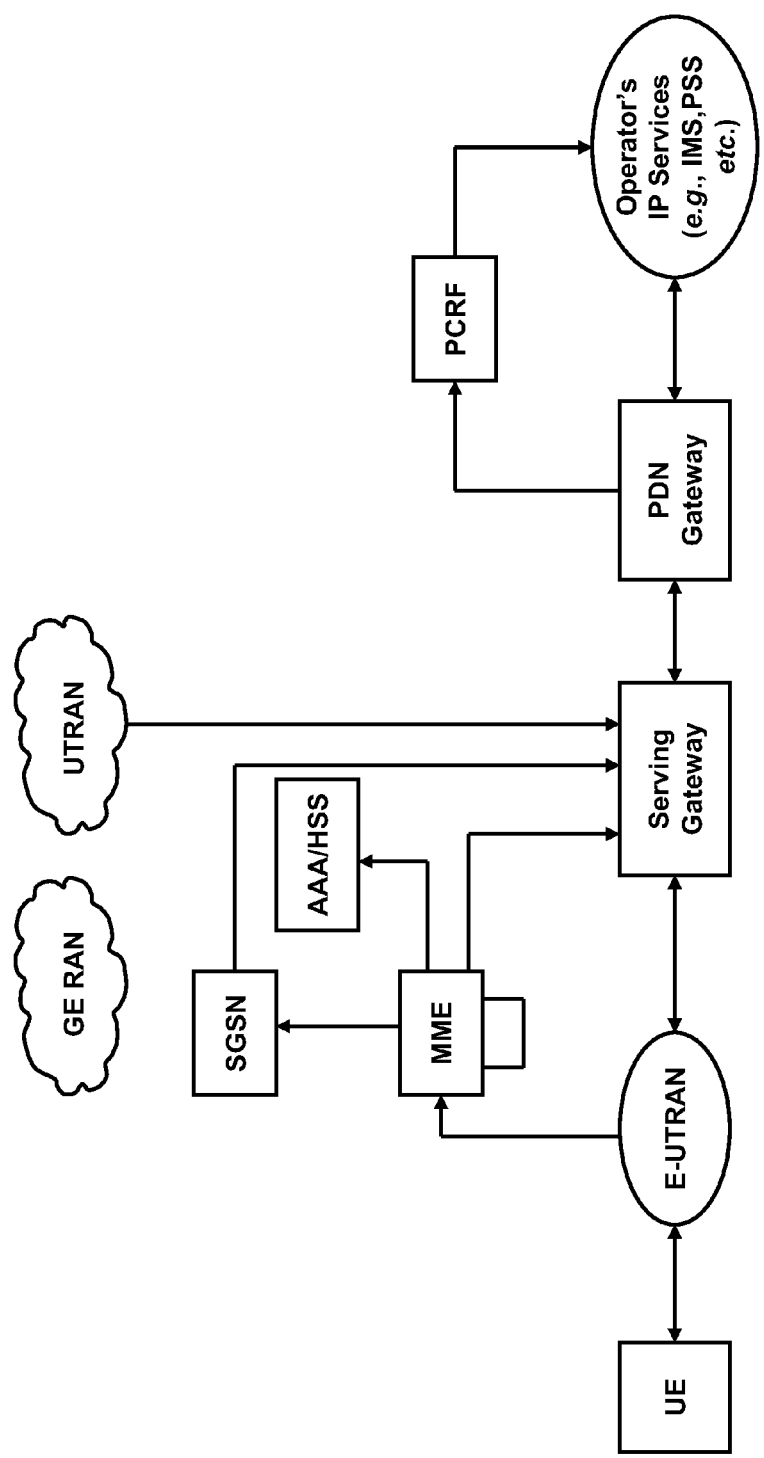
FIG. 7 illustrates a system level diagram of an embodiment of a communication system that provides an environment for application of the principles of the present invention.

Turning now to FIG. 7, illustrated is a system level diagram of an embodiment of a communication system that provides an environment for application of the principles of the present invention. The communication system is reproduced in part from 3GPP TS 23.401 v8.6.0 (2009-06), FIGURE 4.2.1-1, which is incorporated herein by reference, showing an example of a non-roaming architecture for 3GPP access operating under the general structure of UTRAN and GSM Enhanced Data Rates for GSM Evolution ("EDGE") Radio Access Network ("GE RAN"). The user equipment communicates with an E-UTRAN that includes LTE base stations. The E-UTRAN in turn communicates with a packet data network ("PDN") gateway through a serving gateway. The PDN gateway is connected to an AAA server that is logically separate from the HSS server. The PDN gateway is coupled to a policy and charging rules function ("PCRF") server and Operator IP services subsystem including an IP Multimedia Subsystem ("IMS") and a Packet Switched Streaming Service ("PSS") subsytem. The E-UTRAN includes a mobile management entity ("MME") that in turn is coupled to the HSS server and to a serving general packet radio service ("GPRS") support node ("SGSN"). A more detailed analysis of the communication system illustrated in FIG. 7 is provided in the 3GPP TS 23.401, cited above. Some exemplary control plane messages that may be processed by a local area support node as introduced herein will now be described that may be sent through the wide area network.

The local area network typically operates in the licensed exempt band. Uncertainties of the licensed exempt band can lead to situations where the user equipment can "lose" its network connection, for example, due to a temporary outage of a digital subscriber line ("DSL"), temporary outage of solar powered access point or due to interference (e.g., from another local area network). In such situations, the user equipment can utilize its wide area network connection to obtain information from the local area support node to obtain its operational parameters if the local area network is still operational.

Different from the conventional networks that use a static channel, dynamic spectrum usage is assumed, wherein a local area network can operate in different frequency bands (2.4 gigahertz ("GHz")/5 GHz license exempt band, or in "white spaces," i.e., in unused frequency bands such as frequency bands not assigned to or abandoned by a broadcast facility such as a television broadcast facility) at different times. The user equipment can get information about the currently used local area band and operational parameters of the local area networks through the local area support node to enable faster network discovery. Similar information may also be retrieved when the local area support node supports flexible spectrum usage of multiple local area networks.

The local area support node may be employed to host a database that is employed for white-space operation of the local area network. Through the wide area network, the user equipment are able to retrieve information about the local area networks' operational states (e.g., currently operational state or idle state). The local area network can be employed to support an efficient power-save operation for local area access points such as local area routers, and the user equipment can wake up the access points that are in a stand-by mode by sending a message to the local area support node, for example, when arriving at home or at the office. The local area support node may be employed to store presence information of devices that are available for device-to-device communication, or to assist in discovering local area network service offerings. In general, a local area network should cooperate with all existing wide area networks (such as GSM/UMTS/HSPA/LTE). To perform that function, the local area support node inside a wide area network may encapsulate control plane messages that enhance the user experience in the local area network.

The transition of the user equipment from idle to connected mode involves the establishment of a radio resource control ("RRC") connection between the user equipment and base station, activation of related functions including security, and the establishment of a set of default radio bearers to enable data traffic. Depending on network parameters, radio conditions, and network load, delay of performing this process varies. A requirement of an LTE cellular network has been that under specified network conditions, the latency should be less than 100 milliseconds ("ms") in a user equipment-initiated connection. From a dormant to an active state, the latency limitation in a user equipment-initiated connection (depending on if the user equipment has requested resources on a physical uplink control channel ("PUCCH"), or if it has to use random access) is 12 to 17 ms, and about 16 ms in a network-initiated connection when the user equipment is monitoring the physical downlink control channel ("PDCCH") and is unsynchronized. In a network-initiated connection, the network also needs to wait until the user equipment is monitoring the PDCCH (i.e., either discontinuous reception ("DRX") on duration or paging occasions). The discontinuous reception cycles in the LTE cellular network are configured by a base station, and cycles for a long discontinuous reception are 10 to 2048 ms, and for a short discontinuous reception about 2 to 640 ms, with specified steps. If both are configured, the cycle of a long discontinuous reception is a multiple of a short discontinuous reception cycle. The paging default cycles are 320 to 2560 ms. In general, paging default cycles are rarer than discontinuous reception cycles.

The local area network generally operates in the licensed exempt band. As indicated previously above, uncertainties of, and interferences with, the licensed exempt band can lead to situations where the user equipment can "lose" its connection to the local area network as described previously hereinabove. A local area network may employ dynamic spectrum usage and an efficient power-save operation at both the user equipment and the access point. A user equipment in power save with a long sleep cycle will not be able to follow, for example, a band change of the access point. In such situations the user equipment may either be unable to access the network (in the case of jamming), or it may have to do a time- and energy-consuming search for the local area network when the local area network changes an operational parameter such as a frequency band or a channel within the band. In such a situation, the user equipment can be assisted by the local area support node. It is advantageous to enable fast communication to the local area support node using the LTE cellular network radio interface.

As introduced herein, parts of local area related control signaling (e.g., control plane messages) are sent and received by the user equipment through the wide area network. Accordingly, the local area access point communicates with the local area support node, for example, through a mobile management entity or through the Internet. Exemplary control plane messages related to local area control signaling are illustrated in TABLE I below.

TABLE I

| Message Type | Destination | Sender | Content | Delay Sensitive |
|---|---|---|---|---|
| Location Update | Support Node | UE | Location type (wide area cell identification ("ID"); local area cell ID; geographical coordinates; street address); location information | No |
| Service Update | Support Node | UE | Offered Service by UE (available for device-to-device communication; external screen; external storage; etc) | No |
| Wake Up Request | Support Node | UE | Access Point Identification ("AP ID") | Yes |
| Wake Up Response | UE | Support Node | AP ID; Acknowledgement/Non-Acknowledgement ("ACK/NACK") | Yes |
| Operational Parameter Request | Support Node | UE | AP ID | Yes |
| Operational Parameter Response | UE | Support Node | AP ID; Operational parameters of AP (Active/Inactive; Used band (channel for white space operation); authentication method (additional information needed to access the AP. e.g., pre-shared key) | Yes |
| Available Services Request | Support Node | UE | AP ID | Yes |
| Available Services Response | UE | Support Node | Offered Service by AP (Free access to internet; restricted access to internet; external screen; external storage; etc) | Yes |

As indicated by TABLE I above, the user equipment can supply its present location to the local area support node. A user equipment can determine its present location employing a global positioning system ("GPS") device or by triangulation with a plurality of base stations. The user equipment's location can be employed by the local area support node to identify a local area network whose serving area supports the present location of the user equipment.

In cases where the local area support node is inside the operators' network, control plane messages may be sent directly to the local area support node, and functionalities of the local area support node may be integrated inside existing network nodes (e.g., inside a mobile management entity). In the case where the local area support node is outside the operator's network (e.g., the local area support node is positioned in the Internet), the control plane messages are forwarded (tunneled) from an existing wide area network node to the local area support node.

Figure 8:
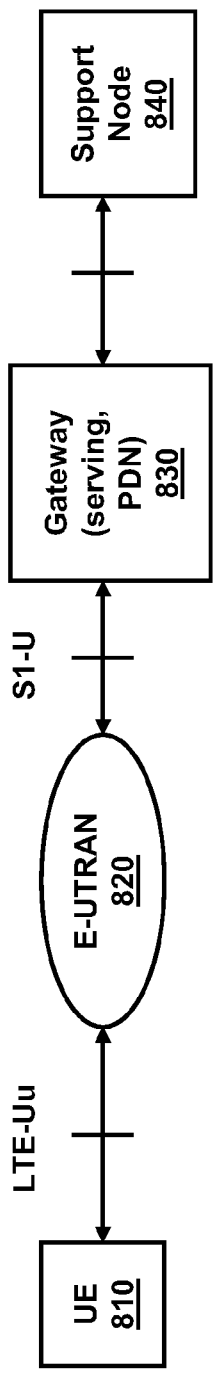
FIGS. 8 and 9 illustrate block diagrams of embodiments of communication paths between a user equipment and a local area support node of a communication system in accordance with the principles of the present invention.

Turning now to FIG. 8, illustrated is a block diagram of an embodiment of a communication path between a user equipment and a local area support node of a communication system in accordance with the principles of the present invention. One way to encapsulate control plane messages is to utilize the user plane of the long term evolution wireless communication system. FIG. 8 demonstrates that the user equipment may send control plane messages via the user plane to the local area support node. More specifically, the user equipment 810 sends a user plane message in an LTE-Uu standard protocol to the E-UTRAN 820 that includes base stations, which in turn sends the message in S1-U standard protocol to a serving/PDN gateway 830. The serving/PDN gateway 830 sends the message employing, for example, a Transmission Control Protocol/Internet Protocol ("TCP/IP") to the local area support node 840. For messages initiated either by the user equipment 810 or by the local area support node 840, regular LTE procedures can be used. For example, the user equipment 810 may request resources from the base station, and when granted, the base station sends the resource message, paging and signaling in a PDCCH during a discontinuous reception period for messages initiated by the local area support node 840. The connection setup delays in the LTE cellular networks are reasonably short, which enables sending messages via the user plane to the local area support node 840. However, the aforementioned messages may not receive high priority, and increased delay in message delivery may result. A prioritization of control plane messages can be achieved by introducing a default radio bearer for local area support operation with low transfer delays.

Long term evolution cellular networks are anticipated to utilize discontinuous reception to enable power-efficient user equipment operation, but operator settings may vary. When utilizing the user plane, the user equipment 810 can be kept in an active state for an unnecessarily long time after sending a message to and receiving a message from the local area support node 840, which potentially increases the power consumption thereof. When utilizing the user plane, the user will be charged for the amount of traffic, which might prevent users without flat-rate billing from using that option. On the other hand, for users with flat-rate billing rates, the operator might want to obtain revenue from supporting local area operation, for example, by charging a small monthly fee for the local area support.

In order to enable flexible charging and to provide a low delay and power efficient operation, the messages to obtain this assistance should be encapsulated in the regular control plane operation of the LTE cellular network to provide visibility to the system operator. The user equipment 810 is able to send and receive messages to support the operation thereof in the local area network through control plane messages to a core network node of the LTE cellular network, and the resulting delays are low since such messages will receive a high priority. The messaging procedure utilizing the regular control plane operation of the LTE cellular network does not require the user equipment to stay active for a longer time than the messaging duration.

Several options are introduced to send messages to a local area support node using the LTE control plane: A non-access stratum ("NAS") message type can be defined. The message can be sent as a short message service ("SMS") message via the E-UTRAN control plane. The non-access stratum is a functional layer in a wireless telecom protocol stack between the core network of the LTE cellular network and a user equipment that supports signaling and traffic therebetween, and includes functions generally related to mobility management, call control, session management, and identity management. In both cases, the control plane messages may be encapsulated in non-access stratum transport messages as described in 3GPP TS 24.301, v8.2.1 (2009-06), which is incorporated herein by reference.

Figure 9:
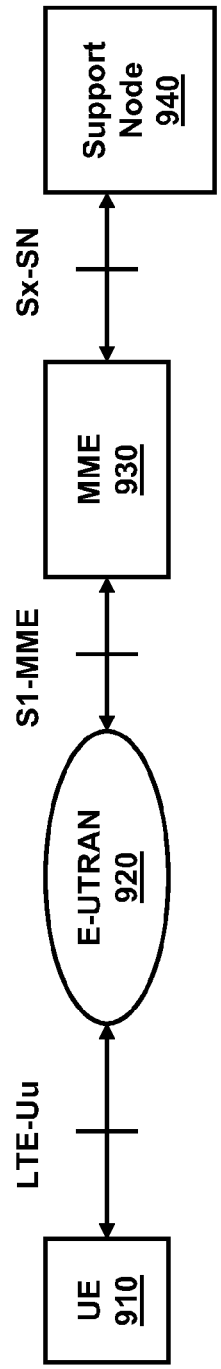

Turning now to FIG. 9, illustrated is a block diagram of an embodiment of a communication path between a user equipment and local area support node of a communication system in accordance with the principles of the present invention. FIG. 9 demonstrates that the user equipment may send control plane messages as radio resource control messages wirelessly using a signaling radio bearer via the user plane to the local area support node. Similar to the operation described with respect to FIG. 8, the user equipment 910 sends a message in LTE-Uu standard protocol to E-UTRAN 920. The E-UTRAN 920 sends the message in S1-MME standard protocol to a mobile management entity 930. The mobile management entity 930 then sends the message in Sx-SN standard protocol to the local area support node 940 that may reside in or may communicate with the mobile management entity 930. A control plane message type is defined so that the mobile management entity 930 can identify the message as a local area control plane message. There are eight bits available to specify 256 possible message types, and currently only 28 message types are specified as illustrated in TABLE 9.8.1 in 3GPP TS 24.301, cited above. Hence, a new local area support message type can be added.

The present non-access stratum transport messages related to evolved packet system ("EPS") mobility management are listed below in TABLE II, reproduced from TABLE 9.8.1 of 3GPP TS 24.301, with an added local area support message as the last entry.

TABLE II

| Bits<br>8 7 6 5 4 3 2 1 | EPS Mobility Management<br>Messages |
| --- | --- |
| 0 1 0 0 0 0 0 1 | Attach request |
| 0 1 0 0 0 0 1 0 | Attach accept |
| 0 1 0 0 0 0 1 1 | Attach complete |
| 0 1 0 0 0 1 0 0 | Attach reject |
| 0 1 0 0 0 1 0 1 | Detach request |
| 0 1 0 0 0 1 1 0 | Detach accept |
| 0 1 0 0 1 0 0 0 | Tracking area update request |
| 0 1 0 0 1 0 0 1 | Tracking area update accept |
| 0 1 0 0 1 0 1 0 | Tracking area update complete |
| 0 1 0 0 1 0 1 1 | Tracking area update reject |
| 0 1 0 0 1 1 0 0 | Extended service request |
| 0 1 0 0 1 1 1 0 | Service reject |
| 0 1 0 1 0 0 0 0 | Globally Unique Temporary Identity ("GUTI") reallocation command |
| 0 1 0 1 0 0 0 1 | GUTI reallocation complete |
| 0 1 0 1 0 0 1 0 | Authentication request |
| 0 1 0 1 0 0 1 1 | Authentication response |
| 0 1 0 1 0 1 0 0 | Authentication reject |
| 0 1 0 1 1 1 0 0 | Authentication failure |
| 0 1 0 1 0 1 0 1 | Identity request |
| 0 1 0 1 0 1 1 0 | Identity response |
| 0 1 0 1 1 1 0 1 | Security mode command |
| 0 1 0 1 1 1 1 0 | Security mode complete |

TABLE II-continued

| Bits<br>8 7 6 5 4 3 2 1 | EPS Mobility Management<br>Messages |
|---|---|
| 0 1 0 1 1 1 1 1 | Security mode reject |
| 0 1 1 0 0 0 0 0 | Evolved Packet System Mobility Management ("EMM") status |
| 0 1 1 0 0 0 0 1 | EMM information |
| 0 1 1 0 0 0 1 0 | Downlink NAS transport |
| 0 1 1 0 0 0 1 1 | Uplink NAS transport |
| 0 1 1 0 0 1 0 0 | Circuit Switched ("CS") Service notification |
| 0 1 1 0 1 0 0 0 | Local area support |

Figure 10:
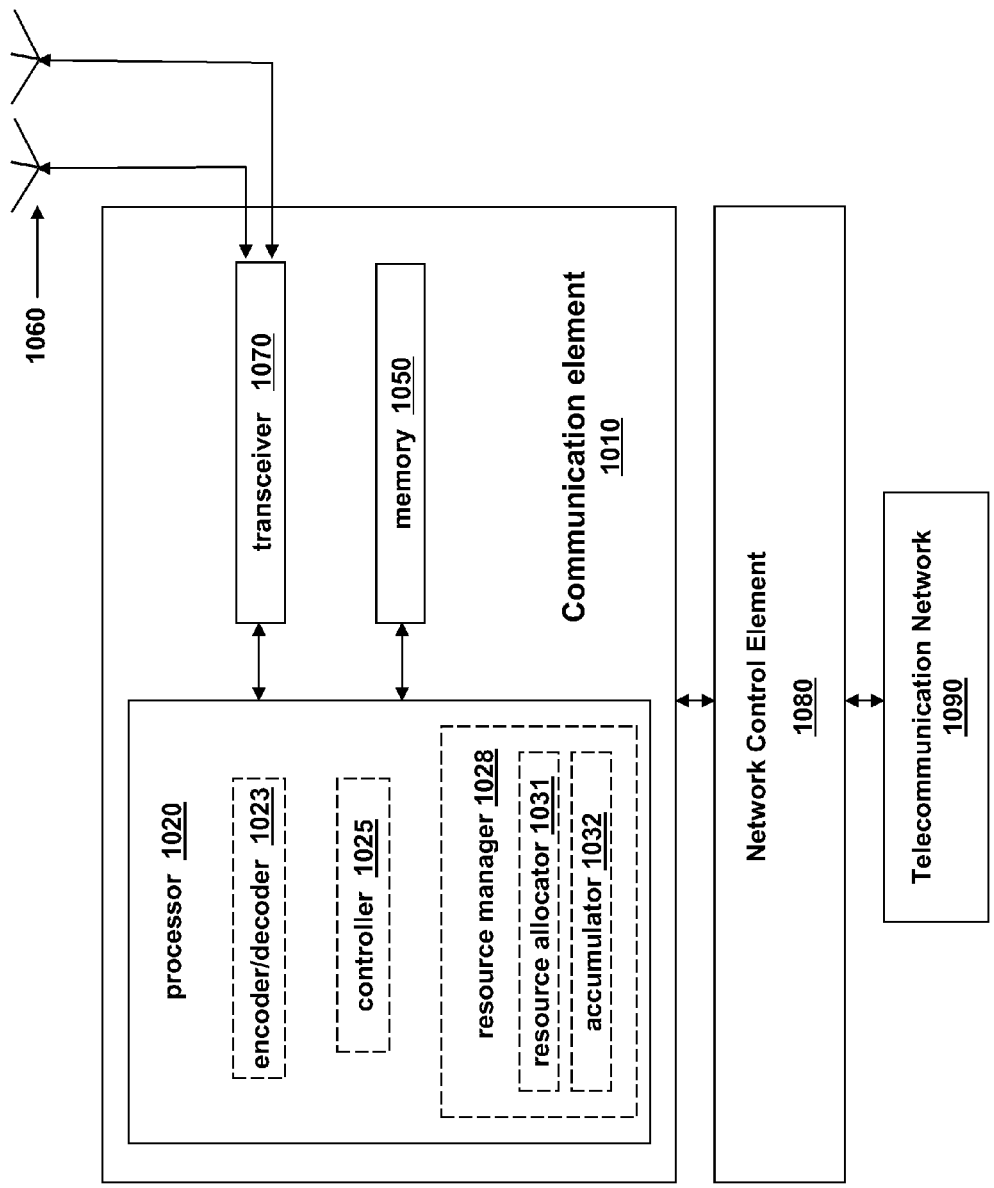
FIG. 10 illustrates a system level diagram of an embodiment of a communication element of a communication system constructed in accordance with the principles of the present invention.

Turning now to FIG. 10, illustrated is a system level diagram of an embodiment of a communication element 1010 of a communication system constructed in accordance with the principles of the present invention. The communication element or device 1010 may represent, without limitation, a base station, user equipment (e.g., a subscriber station, a terminal, a mobile station, a wireless communication device), a network control element, a local area support node, or the like. The communication element 1010 includes, at least, a processor 1020 and memory 1050 that stores programs and data of a temporary or more permanent nature. The communication element 1010 may also include a radio frequency transceiver 1070 coupled to the processor 1020 and a plurality of antennas (one of which is designated 1060). The communication element 1010 may provide point-to-point and/or point-to-multipoint communication services.

The communication element 1010, such as a base station in a cellular network, may be coupled to a communication network element, such as a network control element 1080 coupled to a public switched telecommunication network 1090 ("PSTN"). The network control element 1080 may, in turn, be formed with a processor, memory, and other electronic elements (not shown). The network control element 1080 generally provides access to a telecommunication network such as a PSTN. Access may be provided using fiber optic, coaxial, twisted pair, microwave communication, or similar link coupled to an appropriate link-terminating element. A communication element 1010 formed as user equipment is generally a self-contained device intended to be carried by an end user.

The processor 1020 in the communication element 1010, which may be implemented with one or a plurality of processing devices, performs functions associated with its operation including, without limitation, encoding and decoding (encoder/decoder 1023) of individual bits forming a communication message, formatting of information, and overall control (controller 1025) of the communication element, including processes related to management of resources represented by resource manager 1028. Exemplary functions related to management of resources include, without limitation, hardware installation, traffic management, performance data analysis, tracking of end users and equipment, configuration management, end user administration, management of user equipment, management of tariffs, subscriptions, and billing, accumulation and management of characteristics of a local area network, and the like.

When the communication element 1010 is formed as user equipment, the resource manager 1028 includes a resource allocator 1031 configured to generate a message for an LTE cellular network requesting at least one characteristic of a local area network (e.g., from a local area support node), and an accumulator 1032 configured to receive the at least one characteristic of the local area network (e.g., a WiFi network) from the local area support node to enable the communication element 1010 to communicate with the local area network. In accordance therewith, the communication element 1010 is configured to change a characteristic of the local area network via the resource manager 1028. The message may be one of a control plane message and a user plane message as a function of a state of the communication element 1010 and the message (e.g., a control plane message) may be encapsulated in a non-access stratum message. The message may be a short message system message and may include a location of the communication element 1010. The LTE cellular network may receive the at least one characteristic over a non-wireless communication path from the local area network, and the at least one characteristic includes an operating frequency of the local area network, a request for the local area network to enter an active mode, an authorization key of the local area network and presence information of devices available for device-to-device communication with the communication element 1010.

When the communication element 1010 is formed as a local area support node associated with an LTE cellular network, the accumulator 1032 is configured to receive a message from a user equipment requesting at least one characteristic of a local area network (e.g., a WiFi network), and the resource allocator 1031 is configured to provide the at least one characteristic to enable the user equipment to access the local area network. The message sent to the LTE cellular network may be one of a control plane message and a user plane message as a function of a state of the communication element 1010 and the message (e.g., a control plane message) may be encapsulated in a non-access stratum message. The message may be a short message system message and may include a location of the user equipment. The local area support node associated with the LTE cellular network may receive the at least one characteristic over a non-wireless communication path from the local area network, and the at least one characteristic includes an operating frequency of the local area network, a request for the local area network to enter an active mode, an authorization key of the local area network and presence information of devices available for device-to-device communication with the user equipment.

The execution of all or portions of particular functions or processes related to management of resources may be performed in equipment separate from and/or coupled to the communication element 1010, with the results of such functions or processes communicated for execution to the communication element 1010. The processor 1020 of the communication element 1010 may be of any type suitable to the local application environment, and may include one or more of general-purpose computers, special purpose computers, microprocessors, digital signal processors ("DSPs"), and processors based on a multi-core processor architecture, as non-limiting examples.

The transceiver 1070 of the communication element 1010 modulates information onto a carrier waveform for transmission by the communication element 1010 via the antenna 1060 to another communication element. The transceiver 1070 demodulates information received via the antenna 1060 for further processing by other communication elements. The transceiver 1070 is capable of supporting duplex operation for the communication element 1010.

The memory 1050 of the communication element 1010, as introduced above, may be of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 1050 may include program instructions that, when executed by an associated processor, enable the communication element 1010 to perform tasks as described herein. Of course, the memory 1050 may form a data buffer for data transmitted to and from the communication element 1010. Exemplary embodiments of the system, subsystems, and modules as described herein may be implemented, at least in part, by computer software executable by processors of, for instance, the user equipment and the local area support node, or by hardware, or by combinations thereof. As will become more apparent, systems, subsystems and modules may be embodied in the communication element 1010 as illustrated and described herein.

Figure 12:
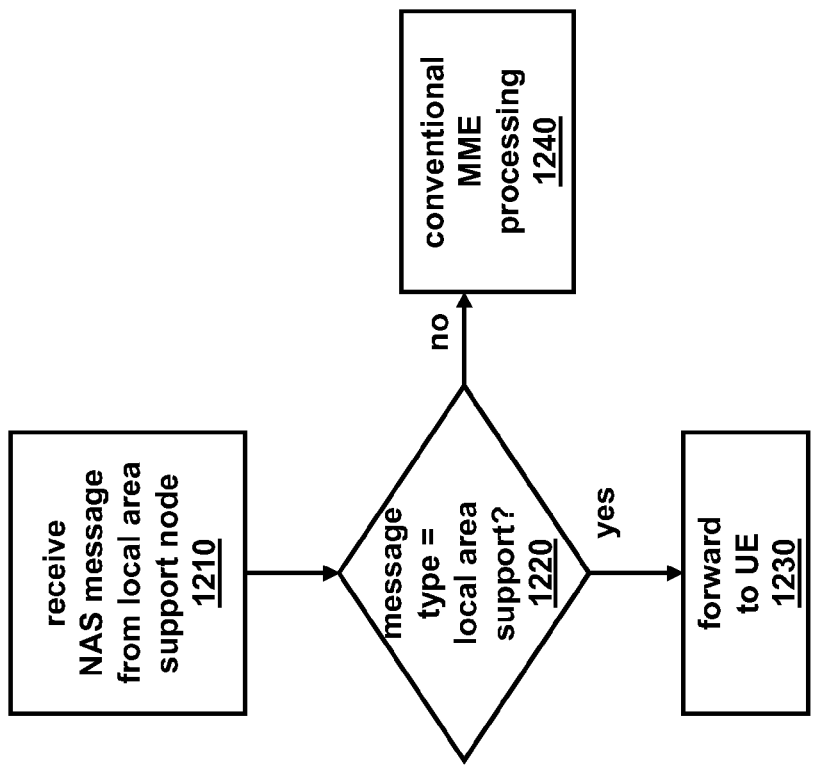
FIGS. 11 to 15 illustrate block diagrams demonstrating an exemplary operation of transporting a message between a user equipment and local area support node in accordance with the principles of the present invention.
Figure 11:
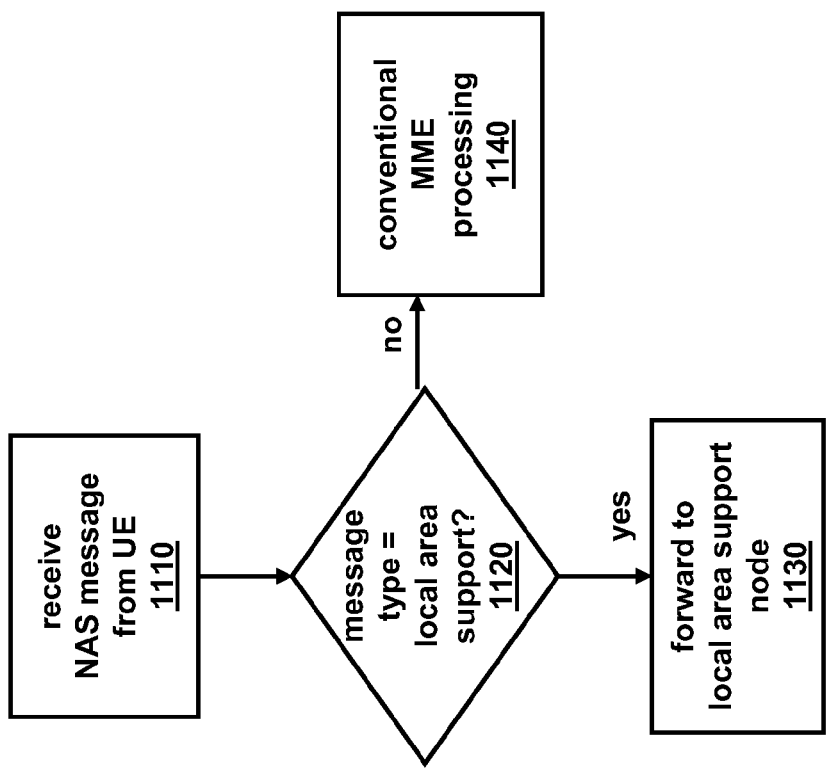

Turning now to FIGS. 11 and 12, illustrated are block diagrams demonstrating an exemplary operation of transporting a non-access stratum message between a user equipment and a local area support node in accordance with the principles of the present invention. As illustrated in FIG. 11, the mobile management entity receives a non-access stratum message from a user equipment, as indicated in a module 1110. If the message is for local area support, as indicated in a module 1120, the message is forwarded to the local area support node, as indicated in a module 1130. If the message is not for local area support, conventional non-access stratum message processing is performed at the mobile management entity, as indicated in a module 1140.

As illustrated in FIG. 12, a mobile management entity receives a non-access stratum message from a local area support node, as indicated in a module 1210. If the message is for local area support, as indicated in a module block 1220, the message is forwarded to the user equipment, as indicated in a module 1230. If the message is not for local area support, conventional non-access stratum message processing is performed at the mobile management entity, as indicated in a module 1240.

The non-access stratum transport protocol also offers the non-access stratum downlink transport and uplink transport to encapsulate a short message service message inside a non-access stratum message. There are eight bits reserved to specify the short message service message type, out of which only three message types are specified. Hence, a new message of type control plane local area support ("CP-LA support") may be introduced in 3GPP LTE to distinguish local area support messages from control plane data, control plane acknowledge ("CP-ACK"), and control plane error that are currently specified, for example as in TABLE 8.1 in 3GPP TS 24.011, v8.2.0 (2009-06), which is incorporated herein by reference. Another option, as illustrated below, is to assign telephone numbers to the local area support node that are recognized by the mobile management entity and have the mobile management entity forward a received short message service message to the local area support node instead of forwarding the message to the short message service switching center.

Figures 13, 14:
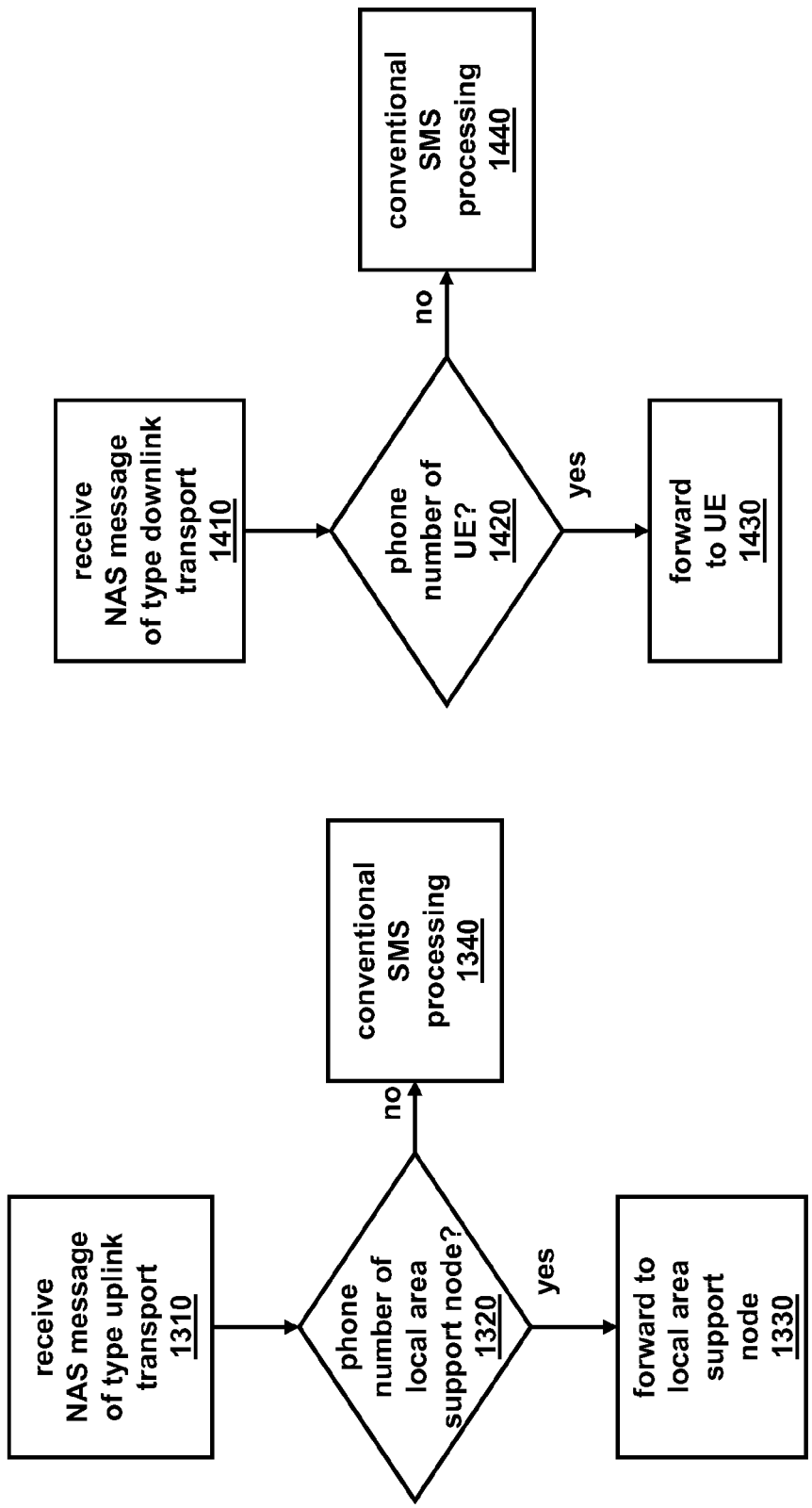

Turning now to FIGS. 13 and 14, illustrated are block diagrams demonstrating an exemplary operation of transporting a short message service message within a non-access stratum message between a user equipment and a local area support node in accordance with the principles of the present invention. As illustrated in FIG. 13, the mobile management entity receives a non-access stratum message from a user equipment, as indicated in a module 1310. If the telephone number in the message is that of a local area support node, as indicated in a module 1320, the mobile management entity forwards the message to the local area support node, as indicated in a module block 1330. If the telephone number in the message is not that of a local area support node, conventional short message service processing is performed at the mobile management entity, as indicated in a module 1340. As illustrated in FIG. 14, a mobile management entity receives a non-access stratum message from a local area support node of type downlink transport, as indicated in a module 1410. If the telephone number in the message is that of a user equipment, as indicated in a module 1420, the mobile management entity forwards the message to the user equipment, as indicated in a module 1430. If the telephone number is not that of a user equipment, conventional short message service processing is performed at the mobile management entity, as indicated in a module 1440.

As described with respect to FIGS. 11 to 14, the mobile management entity forwards messages to the local area support node. Alternatively, the local area support node functionality can be integrated into the mobile management entity as well. If the local area support node is located outside of the operator's network, such as in the Internet, the message may be forwarded (tunneled) to a gateway, and the gateway forwards the message to the local area support node.

In many cases, the user equipment will be able to decide whether to send a local area message to the local area support node via the LTE user plane or via the LTE control plane. The user equipment can decide which encapsulation method to use based on its current state. The user equipment will preferably use the control plane encapsulation to ensure low delays and low power consumption. When the user equipment is in an active state, sending messages via the user plane will be the preferred option, since there will not be setup delays. Further, the additional power consumption is low because the user equipment is already in an active state.

Figure 15:
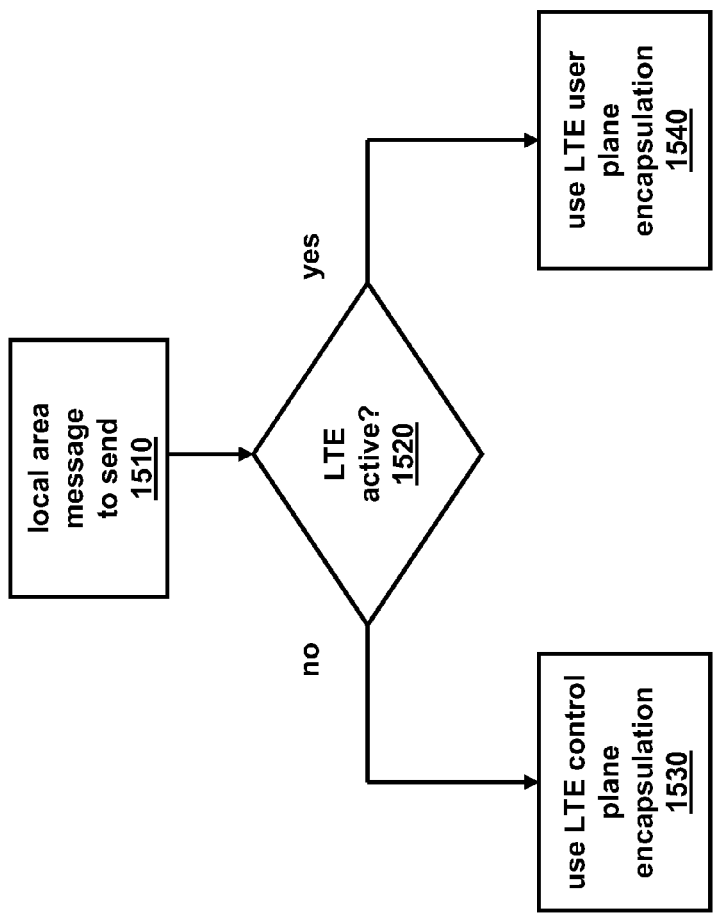

Turning now to FIG. 15, illustrated is a block diagram demonstrating an exemplary operation of transporting a message between a user equipment and a local area support node in accordance with the principles of the present invention. When the user equipment has a local area message to send to a local area support node, as indicated in a module 1510, it is determined if the user equipment is in an LTE active state, as illustrated in a module 1520. If the user equipment is in an LTE active state, then the user equipment employs user plane encapsulation to transmit the message to the local area support node, as indicated in a module 1540. If the user equipment is not in an LTE active state, then the user equipment employs control plane encapsulation to transmit the message to the local area support node, as indicated in a module 1530.

Figure 16:
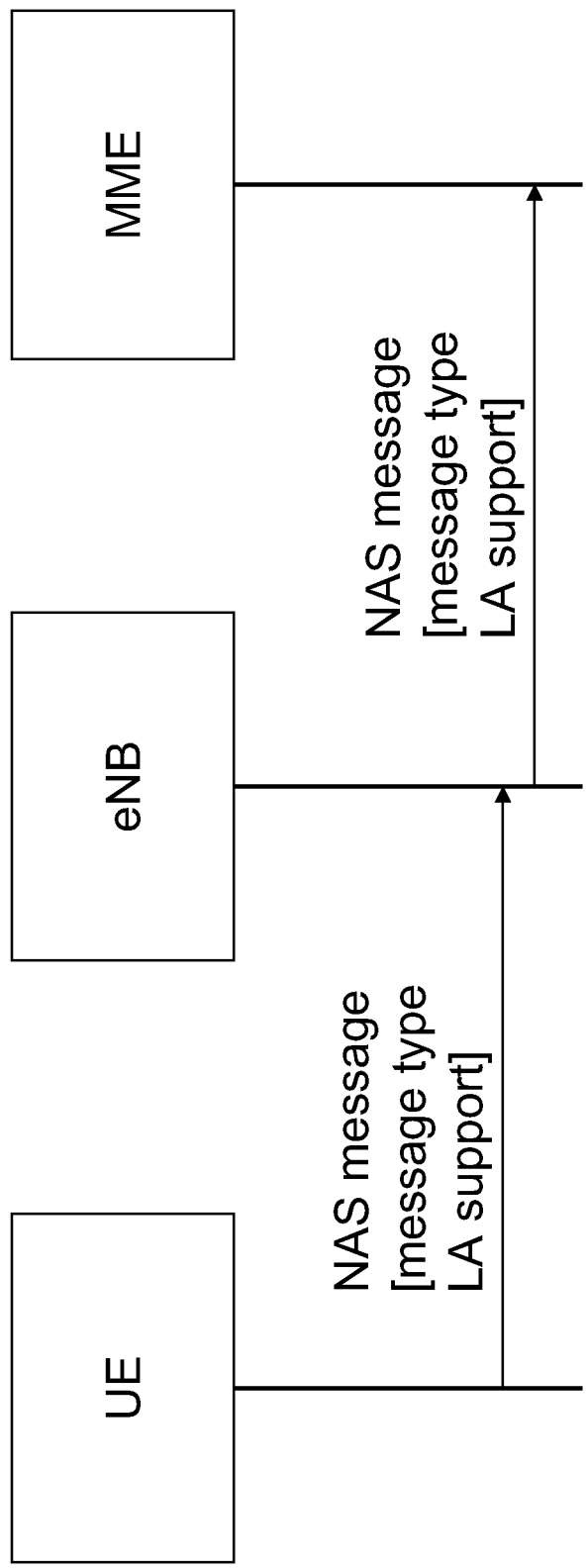
FIG. 16 illustrates a signaling diagram of an embodiment of transporting a control plane message in a non-access stratum message between a user equipment and a local area support node in accordance with the principles of the present invention.

In accordance with the foregoing, FIG. 16 illustrates a signaling diagram of an embodiment of transporting a control plane message in a non-access stratum message between a user equipment and a local area support node in accordance with the principles of the present invention. In the illustrated embodiment, the local area support node is associated with a mobile management entity and the control plane message is encapsulated in a non-access stratum message. The non-access stratum message including the control plane message is transported from the user equipment (designated "UE") through a base station (designated "eNB") to the mobile management entity (designated "MME"). The non-access stratum message is a local area ("LA") message type indicating to the mobile management entity to transfer the message to the local area support node for processing. An exemplary local area message is described above with respect to TABLE I.

Thus, a new default radio bearer has been introduced herein for local area support using the user plane of the LTE network. A new non-access stratum message for local area support, mobile management entity enhanced, has been introduced herein so that a non-access stratum message of this type can be forwarded to the local area support node. The short message service message is employed to send messages to the local area support node, mobile management entity enhanced, to a local area support node instead of a short message service switching center. The user equipment makes a decision whether to use the user plane or the control plane based on its current state. These processes enable fast message exchange between a user equipment and a local area support node that supports local area network operation through control plane messages encapsulated in existing LTE non-access stratum signaling or the like. Three options were described to allow flexible charging for operators that support local area operation. One option wherein a message is encapsulated as a short message service message allows premium charging. Another option wherein a message is encapsulated in the user plane allows charging by bytes. The third option wherein a message is encapsulated in non-access stratum message allows charging a flat rate for local area support.

Program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   at least one processor; and
   at least one memory including computer program code, where the at least one memory and the computer program code are configured, with the at least one processor, to cause the apparatus to at least:
   generate a message for a long term evolution cellular network requesting at least one characteristic of a local area network to enable a user equipment to access said local area network, wherein said message is encapsulated as one of a control plane message and a user plane message in a non-access stratum transport message as a function of a state of the user equipment;
   send the encapsulated message towards a mobility management entity of the long term evolution cellular network to be, based on the message, one of processed by the mobility management entity or forwarded to a local area support node of the local area network; and
   in response to the sending, receive said at least one characteristic of said local area network to enable said user equipment to access said local area network.

2. The apparatus as recited in claim 1, wherein the at least one memory including the computer program code is configured with the at least one processor to cause the apparatus to change a characteristic of said local area network.

3. The apparatus as recited in claim 1, wherein state of said user equipment is one of a long term evolution idle state and active state, and wherein when the state of the user equipment is an active state said message is encapsulated as a user plane message, and wherein when the state of the user equipment is an idle state said message is encapsulated as a control plane message in said non-access stratum message.

4. The apparatus as recited in claim 1, wherein said message for said long-term evolution cellular network includes a location of said user equipment.

5. The apparatus as recited in claim 1, wherein said non-access stratum transport message encapsulated as a control plane message for said long term evolution cellular network comprises a short message system message.

6. The apparatus as recited in claim 5, wherein said non-access stratum transport message comprises an eight bit field reserved to specify the short message service message of the encapsulated control plane message.

7. The apparatus as recited in claim 1, wherein said at least one characteristic is received over a non-wireless communication path from said local area network.

8. The apparatus as recited in claim 1, wherein said at least one characteristic comprises at least one of:
   an operating frequency of said local area network,
   a request for said local area network to enter an active mode,
   an authorization key of said local area network, and
   presence information of devices available for device-to-device communication with said user equipment.

9. The apparatus as recited in claim 1, wherein said long term evolution cellular network comprises said local area support node associated with said mobile management entity for accumulating said at least one characteristic of said local area network, and wherein said local area network is a WiFi network.

10. The apparatus as recited in claim 1, wherein the encapsulated message comprises a telephone number, wherein if the telephone number is associated with the local area support node the encapsulated message is forwarded via the mobile management entity to the local area support node, and wherein if the telephone number is not associated with the local area support node the encapsulated message is processed with conventional short message service processing with the mobile management entity.

11. An apparatus, comprising:
    at least one processor; and
    at least one memory including computer program code, where the at least one memory and the computer program code are configured, with the at least one processor, to cause the apparatus to at least:
    receive a message from a user equipment requesting at least one characteristic of a local area network to enable said user equipment to access said local area network, wherein said message is encapsulated as one of a control plane message and a user plane message in a non-access stratum transport message as a function of a state of said user equipment; and
    provide said at least one characteristic to enable said user equipment to access said local area network, based on the message, one of via conventional short message service processing with a mobile management entity or via a local area support node associated with a long term evolution cellular network.

12. The apparatus as recited in claim 11, wherein said user equipment is configured to change a characteristic of said local area network.

13. The apparatus as recited in claim 11, wherein said state of said user equipment is one of a long term evolution idle state and active state, and wherein when the state of the user equipment is an active state said message is encapsulated as a user plane message, and wherein when the state of the user equipment is an idle state said message is encapsulated as a control plane message in said non-access stratum message.

14. The apparatus as recited in claim 11, wherein said message from said user equipment includes a location of said user equipment.

15. The apparatus as recited in claim 11, wherein said non-access stratum transport message encapsulated as a control plane message from said user equipment comprises a short message system message.

16. The apparatus as recited in claim 11, wherein said long term evolution cellular network is configured to receive said at least one characteristic over a non-wireless communication path from said local area network.

17. The apparatus as recited in claim 11, wherein said at least one characteristic comprises at least one of:
    an operating frequency of said local area network,
    a request for said local area network to enter an active mode,
    an authorization key of said local area network, and
    presence information of devices available for device-to-device communication with said user equipment.

18. The apparatus as recited in claim 11, wherein said local area support node is associated with said mobile management entity of said long term evolution cellular network, and wherein said local area network is a WiFi network.

19. A method, comprising:
    generating a message for a long term evolution cellular network requesting at least one characteristic of a local area network to enable a user equipment to access said local area network, wherein said message is encapsulated as one of a control plane message and a user plane message in a non-access stratum transport message as a function of a state of said user equipment;
    send the encapsulated message towards a mobility management entity to be, based on the message, one of processed by the mobility management entity or forwarded to a local area support node of the local area network; and
    in response to the sending, receiving said at least one characteristic of said local area network to enable a user equipment to access said local area network.

20. The method as recited in claim 19, further comprising changing a characteristic of said local area network.

21. The method as recited in claim 19, wherein said state of said user equipment is one of a long term evolution idle state and active state, and wherein when the state of the user equipment is an active state said message is encapsulated as a user plane message, and wherein when the state of the user equipment is an idle state said message is encapsulated as a control plane message in said non-access stratum message.

22. The method as recited in claim 19, wherein said at least one characteristic comprises at least one of:
    an operating frequency of said local area network,
    a request for said local area network to enter an active mode,
    an authorization key of said local area network, and
    presence information of devices available for device-to-device communication with said user equipment.

* * * * *